April 10, 1951 F. S. MABRY ET AL 2,548,383

RADIO RECEIVER

Filed Sept. 12, 1946 2 Sheets-Sheet 1

WITNESSES:

INVENTORS
Forrest S. Mabry and
William R. Wilson.
BY
F. W. Lyle
ATTORNEY

RADIO RECEIVER

Filed Sept. 12, 1946 2 Sheets-Sheet 2

WITNESSES:

INVENTORS
Forrest S. Mabry and
William R. Wilson.
BY
F. W. Lyle.
ATTORNEY

Patented Apr. 10, 1951

2,548,383

UNITED STATES PATENT OFFICE 2,548,383

RADIO RECEIVER

Forrest S. Mabry and William R. Wilson, Baltimore, Md., assignors, by mesne assignments, to the United States of America as represented by the Secretary of the Navy Application September 12, 1946, Serial No. 696,577

1 Claim. (Cl. 250—20)

Our invention relates to a component electron-tube unit for ultra-high frequency electrical circuits, and in particular, relates to an improved form of structure and arrangement for such a unit comprising an amplifier, an oscillator and a mixer or intermediate frequency converter useful, for example, in superheterodyne receivers.

In employing circuits for ultra-high frequency waves, such, for example, as those which have come into wide use during the past few years for radar and communication systems, difficult problems arise from the distributed inductance and capacitance of the elements of electron tubes and of the lead wires interconnecting such tubes into operative high-frequency circuits. At the frequencies used in ordinary broadcasting the various electron tubes comprised in amplifiers, superheterodyne circuits and the like can readily be located sufficiently close to each other, without the necessity for unusual structural arrangements, so that the distributed inductance and capacitance of the lead wires interconnecting the tubes is negligible compared with the lumped inductances and capacitances employed in the circuits. However, as sets are designed for higher and higher frequencies, a stage is reached when the distributed inductances and capacitances of the interconnecting lead wires become substantial, and even controlling compared with the lumped capacitances and inductances required to tune the resonant circuits at the frequencies involved. Moreover, the size of the lumped inductances and capacitances constituting the resonant circuit grows smaller and smaller, and the stray power radiated and lost from them grows larger and larger so that it becomes necessary to abandon the use of conventional inductors and capacitors familiar in broadcasting frequencies and to substitute, for the ordinary tuned circuits, resonant chambers of one type or another. Small sections of concentric transmission lines, that is to say a central conductive core surrounded by a conducting sheath, constitute a type of resonant chamber which has numerous advantages for many purposes.

Likewise, the electrode capacitance of conventional broadcasting tubes is so great that at ultra-high frequencies they cannot be used without difficulty, and as a result, a particular type of electron tube structure, quite different from the conventional broadcasting electron tubes, and commonly called the "lighthouse tube" has come into wide use.

In view of all the foregoing considerations, the design of a supporting and shielding structure in which electron tubes may be operated in certain desired circuits, such as the heterodyning circuit employing an R. F. amplifier, an oscillator and a mixer or I. F. converter, analagous to similar circuits widely employed at broadcasting frequencies is a problem of considerable difficulty.

One object of our invention is, accordingly, to provide a supporting and shielding structure in which three ultra-high frequency electron tubes may be operatively connected into a heterodyning circuit comprising an amplifier, an oscillator and a mixer or I. F. converter.

Another object of our invention is to provide an arrangement in which ultra-high frequency tubes are supported in a unit structure comprising chambers which perform the dual function of resonators and shields capable of preventing the loss of substantial amounts of ultra-high frequency power stray radiation.

Still another object of our invention is to provide a structure comprising a plurality of conducting metal chambers which may be conveniently and cheaply produced by die casting and which supports and interconnects a plurality of ultra-high frequency radio tubes in an operative circuit relation.

Still another object of our invention is to provide an enclosing structure comprising a plurality of chambers which support and interconnect ultra-high frequency radio tubes for operation, but which are so constructed as to make the radio tubes themselves readily accessible and to permit their easy removal for inspection or replacement.

Other objects of our invention will become apparent upon reading the following description taken in connection with the drawings, in which.

Figures 1, 2:
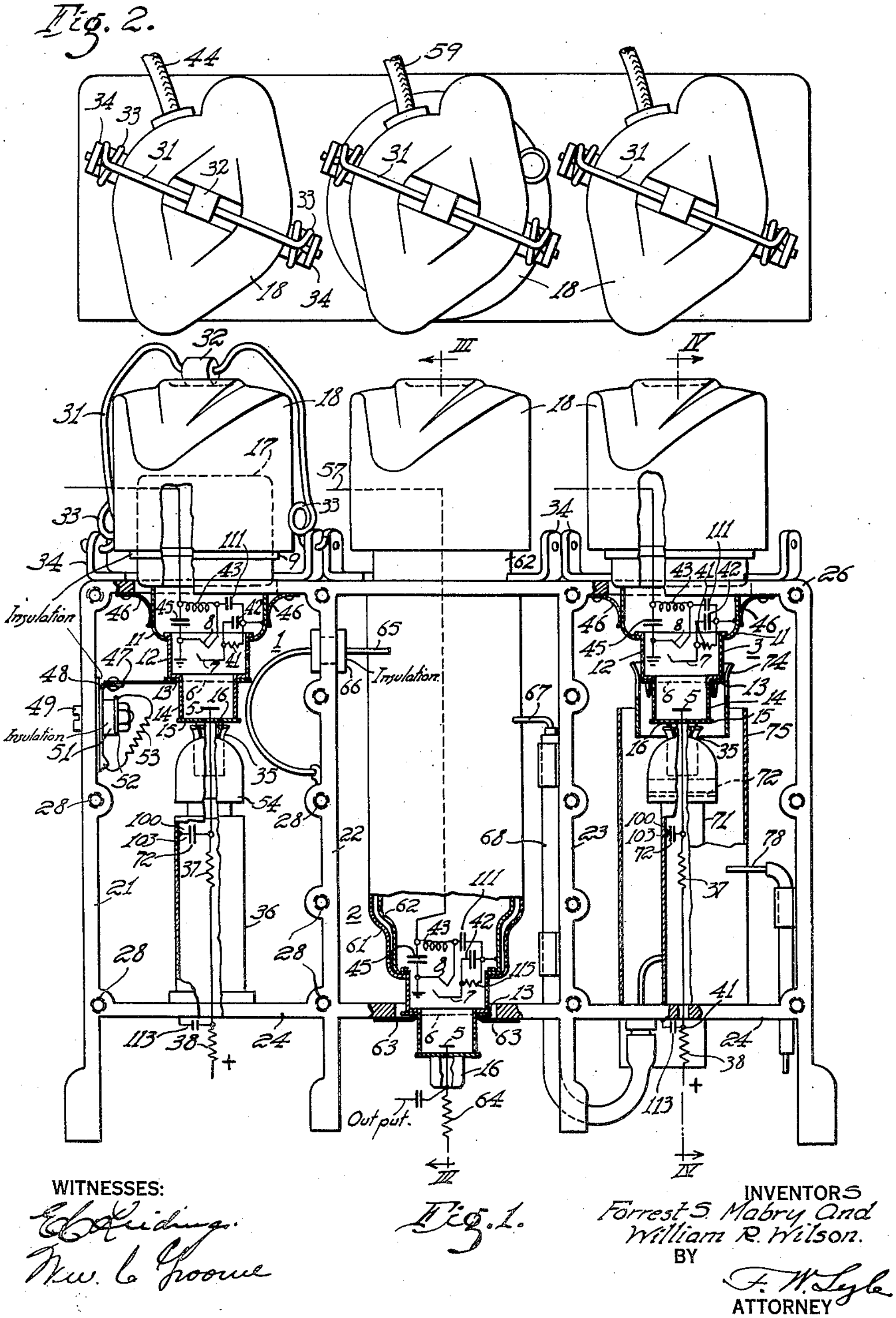
Figure 1 is a view in elevation of an enclosing structure particularly adapted for interconnecting three ultra-high frequency radio tubes to act as an oscillator, an amplifier and a mixer or I. F. converter.
Fig. 2 is a top view of the structure of Fig. 1.

Referring to the drawings in detail, 1, 2 and 3 are three ultra-high frequency electron tubes of a type commonly known as "lighthouse tubes," which are to be connected together for heterodyning and amplifying purposes; 1 acting as an oscillation generator; 2 a mixer or converter; and 3 as an amplifier of incoming power. We have diagrammatically shown in each of these tubes an anode 5, a control electrode 6, a unipotential cathode 7 and a heater filament 8 therefor by symbols conventional in the art, it being understood that these are symbolic rather than structurally representative of the internal arrangements of the "lighthouse tubes." Each "lighthouse tube" does, however, have the general external appearance shown at 1 comprising an insulating base 9 supporting a cylindrical metallic sleeve 11 which is connected capacitively to the unipotential cathode 7 and which supports a shock-glass cylinder 12, which, in turn, supports a metal rim 13 attached to the control electrode 6. The rim 13 in turn supports a second glass cylinder 14 capped at its upper end by a metal plate 15 which is connected to the anode 5 and is provided with a cylindrical extension or cap 16 adapted to make contact with inleading conductors in a manner well known in the tube art.

The base 9 fits into a socket 17 of insulating material, which, in turn, is fastened into a cup-like cap 18 of sheet metal. The tube 1, socket 17 and cap 18 constitute, when assembled, a unitary structure which can be handled and removed as a unit from the remainder of the structure in the manner of the supporting chamber of Fig. 1.

The supporting structure embodying the main features of my invention comprises a die-cast metal envelope 21 divided into three adjacent chambers by integral metal walls 22 and 23. The floor of each chamber is formed by an integral wall 24 which is provided with suitable central openings through which may pass the inleading conductors to the anode of the oscillator 1 and amplifier 3, and through which projects the lower part of the tube 2 in a manner to be described in more detail later.

Figure 3:
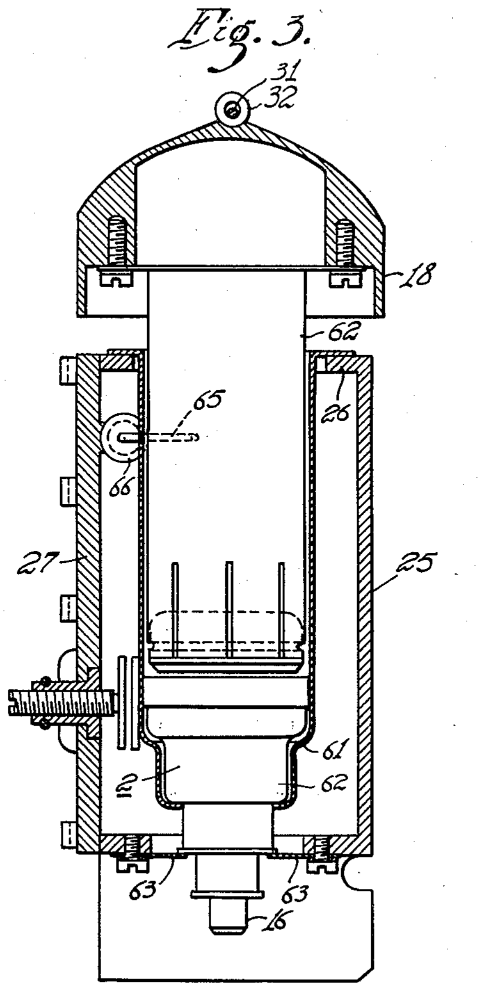
Fig. 3 is a sectional view taken along the line III—III in Fig. 1.
Figure 4:
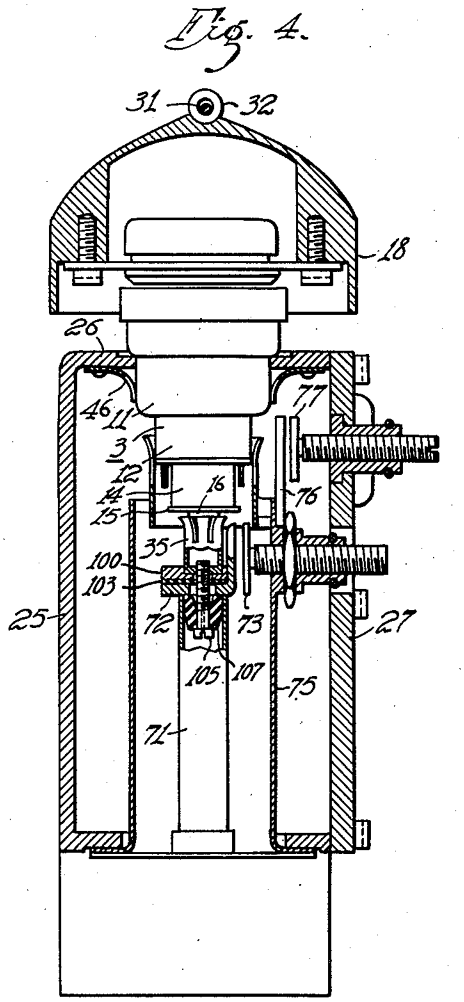
Fig. 4 is a sectional view taken along the line IV—IV in Fig. 1.

As is evident from Figs. 3 and 4, the rear wall of the chambers 21, 22 and 23 is a continuous integral metal plate 25. The top of the respective chambers is likewise formed by a metal plate 26 cast integral with the structure so far described and provided over the center of each chamber with openings through which may project the tubes 1 and 3, and the support for the tube 2 in a manner to be described in more detail later.

The front of the three chambers above described is arranged to be closed by a continuous metal plate 27 adapted to be removably held in place by screws threaded into the holes 28 in the side walls 21, 22 and 23 of the chambers. As will be described in more detail below, the removable wall 27 is arranged to support adjustable tuning members which form tuning capacitors with parts of the tubular members centrally positioned within the chambers.

As was previously stated, the tubes 1, 2 and 3 together with their caps which are removably supported constitute removable units which may be taken out of the electrical circuit for inspection or the like. In order to hold them securely in place when in use, we provide resilient members 31, each of roughly U-form and supporting a small roller 32. The members 31 are of resilient wire provided with spring-forming loops 33 and having their ends threaded through holes in ears 34 which are fastened to the top plate 26. The members 31 are so proportioned that when the tubes 1, 2 and 3 are in proper position in the three chambers above mentioned, the rollers 32 are pressed downward on the tops of the caps 18 and exert a downward pressure on the tubes 1 and the caps 18 in which they are pressed. When it is desired to remove any of the tubes 1, 2 and 3 for inspection, the upper ends of the members 31 are moved in a direction corresponding to the plane of the shape in Fig. 1, rotating about the projecting ends which pass through holes in the members 34 until the caps 18 are relieved from contact with the rollers 32. The tubes 1, 2 and 3 may then be removed at will; and when returned to position within the chambers, the members 31 are again turned to bring the rollers 32 over the center of the top of the caps 18 thereby again exerting a downward pressure on the latter and the tubes 1, 2 and 3 which they support.

The cap 16 of tube 1 is pressed downward into a flexible clasp, or plate contact, 35 which is attached to the upper end of a metallic tube, or plate line, 36 having its base attached to the bottom plate 24. The tip of the contact 35 is in the form of a cylindrical plug and is seated in a circular recess in a semi-circular metallic pad 100. The pad rests on one plate of an angle 72, the other plate of which extends parallel to the contact 35. The pad is insulated from the angle 72 by a mica strip 103. The assembly consisting of the contact 35, pad 100, mica strip 103 and angle 72 are held together by a screw 105, the head of which engages an insulating washer 107 and the threaded end of which engages the tip of the contact, pressing the washer against the angle 72. A clearance hole is provided in the angle plate 72 so that the screw remains insulated from the latter. The condenser formed between pad 100 and angle 72 constitutes a by-pass capacity to the plate line 36.

Inside the tubular plate line 36 are located a resistor 37 connected at its upper end to the contact 35 and connected at its lower end to a line conductor which is passed through a feedthru type by-pass capacitor 113 in the bottom plate 24. After passing through the bottom plate 24, the last-mentioned lead wire is connected through a resistor 38 to the positive terminals of a source of direct current voltage of which the negative terminal is connected to the walls 21, 22 and 23.

A biasing resistor 41 in parallel with an R. F. by-pass capacitor 42 is connected between cathode 7 and ground (the grounded shell of the tube base). Heating current for the filament 8 is supplied through an R. F. choke 43 both terminals of which are by-passed to ground (shell of the tube base) by capacitors 45 and 111 respectively. The components 41, 42, 43, 45 and 111 are supported on the terminals of tube socket 17 which projects into the cap 18.

Contact is made between the cylinder wall portion of the tube 1 and the top plate 26 by a series of flexible metal fingers 46. Contact is likewise made from the metal plate 13 which is connected to the control electrode 6 by a flexible metal finger 47 which is supported on the wall 21 but insulated therefrom by a mica plate 48. The finger 47 and the mica plate are held in position against the wall 21 by a machine screw 49 separated from the finger 47 by an insulator 51 having on its outer surface a terminal washer 52. The terminal washer 52 is connected to the wall 21 by the machine screw 49 and is likewise connected to one end of a resistor 53, the other end of which is connected to the finger 47. The members 47, 48 and 53 will be seen to constitute a grid leak and condenser intervening between the control electrode 6 and the grounded casing 21.

The annular space between the outer surface of the cylinder 36 and the interior surface of the chamber containing tube 1 constitutes a small section of concentric line having its ends closed by conductive plates, and each constitutes a reservoir active at the frequency of the alternating current in the tube 1. The interior walls of the chamber constitute, in effect, an inductive member in a resonant circuit, one end of this conductor being connected to the cathode of the tube 1 at the upper end of the chamber and the other end of this inductance being connected to the anode of the tube 1. The machine screw 49 in effect connects an intermediate point on this inductor with the control grid 6 of the tube 1 through the grid leak and condenser described above. The circuit arrangement thus produced is, in effect, an oscillator probably of the transit-time type which will cause the tube 1 to generate oscillations at a frequency determined by the resonating constants of the chamber in which the tube 1 is located.

The frequency at which the above-mentioned chamber will resonate may be adjusted in accordance with the principles well known in the art, by shunting a variable capacitor between the central core 36 and the walls of the chamber 21. An angle 72 attached to the upper end of the central cylinder 36 is adapted to act as one plate of such a condenser and a cooperating plate may be supported on a screw threaded through the front plate 27, this screw being moved in and out to change the gap between the angle 72 and its associated plate, thereby varying the capacity of the shunting condenser between the upper end of the cylinder 36 and the walls of the chamber.

The metal chamber between the walls 22 and 23 is provided with a downwardly projecting metal cylinder 61 attached at its upper end to the top plate 26 and projecting now down to the floor plate 24. Inside the cylinder 61 is positioned a second cylinder 62 which projects through a hole in the top plate 26 and is connected to the cap 18. At its lower end the cylinder 62 supports an insulating base 17 similar to that already described in connection with tube 1, and this base acts as a socket for the tube 2. This socket contains a similar arrangement of resistor 115 and capacitors 42, 45 and 111 and inductor 43 to that already described in connection with tube 1 except that the ungrounded terminal of the filament 8 is connected to an inductor 56 and a lead 57 to the same terminal of the source of heating current as is the conductor 44.

The control electrode 6 of the tube 2 is connected through the metal plate 13 of the tube 2 and a set of flexible contact fingers 63 to the floor plate 24. The anode cap 16 is adapted to be connected by any suitable means well known in the art through a resistor 64 to the positive terminal of a voltage source of which the negative terminal is grounded and connected to the metal walls of the assembly.

The cylinder 61 constitutes in effect an impedance intervening between the cathode 7 and the control electrode 6 of the tube 2 which is connected by means of fingers 63 to the grounded top plate 26 of the chamber containing the cylinder 61. A conductor 65 has one end connected to a suitable point on the cylinder 61 and passes through an insulator 66 in the wall 22 to form a loop having its other end connected to the wall 22. The loop just mentioned is positioned in the resonating chamber containing the tube 1 and oscillating voltages induced in it from the tube 1 and its cavity are impressed on the cathode impedance of tube 2 which is constituted by the cylinder 61.

A conductor 67 is connected to another suitable point on the cylinder 61 and leads through an insulated concentric cable 68 into the chamber containing tube 3.

Tube 3 is removably supported within its enclosing chamber from a cap 18 just as has already been described for tube 1. The cathode circuit of tube 3 is likewise connected to the top plate 26 by flexible metal fingers 46 similar to those described in connection with tube 1. The cathode connections of tube 3 are precisely similar to those already described in connection with tube 1 so that a repetition of this description here is unnecessary. The cap 16 of tube 3 is supported by a flexible clasp or plate contact 35 on the upper end of a tubular cylinder 71 having its lower end attached to the bottom plate 24 in the same manner as is the cap 16 of tube 1. The anode of tube 3 is connected to the terminal of an external voltage source in the same way as has been described for the anode of tube 1 and the description need not be given in detail here. The upper end of the cylinder 71 is provided with an angle 72, the vertical leg of which is adapted to cooperate with a movable plate 73 to form a tuned capacitor as shown in more detail in Fig. 4.

The control electrode 6 of tube 3 is connected through its plate 13 and a set of flexible fingers 74 to the upper end of a metal tube 75, the lower end of which is connected to the floor plate 24.

The annular space between the tubes 71 and 75 constitutes a resonant cavity interconnecting the plate and grid of the tube 3. As in the case of Fig. 1, this cavity may have its resonant frequency varied by the adjustable condenser comprising the members 72 and 73 shown in Fig. 4. The plate 73 is supported by a threaded screw on the tube 75, this screw passing through a hole in the front plate 27.

The annular space between the cylinder 75 and the interior walls of chamber containing tube 3 constitutes a cavity resonator between the cathode and grid of the tube 3. As is shown more clearly in Fig. 4, the tube 75 is provided at its upper end with a flat plate 76 which cooperates with a movable plate 77 supported on a screw threaded through the cover plate 27. By adjusting the position of the plate 77, it is possible to tune the cathode to grid cavity resonator above mentioned.

The tube 71 constitutes, in effect, an impedance in the plate circuit of the tube 3 and the conductor 67 is connected at one end to a suitable point on the impedance. This conductor, accordingly, impresses voltage of the frequency present in the amplifier tube 3 on a point in the cathode impedance of the mixer or converter tube 2.

Incoming ultra-high frequency signals are impressed on the grid circuit of tube 3 by means of a conductor 78 which passes in coaxial cable through the floor plate 24 and is tapped at a suitable point to the grid-cylinder 75. A moment's consideration will show that where an incoming signal is impressed on the grid of the amplifier tube 3 by the conductor 78, this tube will act as an amplifier and the voltage in its plate circuit comprising cylinder 71 will be impressed by conductor 67 on the cathode line of tube 2. The conductor 65 picking up voltage of the frequency being generated by the oscillator tube 1 will impress the latter frequency likewise on the cathode line of the mixer tube 2. The result of this will be in the plate circuit of the mixer tube 2, a voltage having, among other frequencies, the difference-frequency of the amplifier 3 and the oscillator. A suitable outgoing network filtering out the other (undesired) frequencies connected to the anode of tube 16 may be used to impress this difference-frequency on any other desired apparatus. For example, this difference-frequency may be impressed on the intermediate frequency amplifiers of a superheterodyne receiver.

In an R. F. assembly in accordance with our invention which we have found to operate satisfactorily, the tubes 1, 2 and 3 are all "lighthouse tubes" type 2C40.1. A2C46 tube would also operate satisfactorily. Capacitors 42, 45, 111 and 113 are all 470 mmf. Resistors 37, 38 and 53 are 1000 ohms each, resistor 41 is 560 ohms, resistor 115 is 2200 ohms, resistor 64 is 47,000 ohms. The chokes 43 are resonant at 60 mc., the I. F. The lines and cavities are approximately of the dimensions shown in the drawing, and may be scaled from the drawing. The mica strips 103 and 48 are approximately .005 inch in thickness. The anode-cathode potential for tubes 1 and 2 is relatively low of the order of 100 volts. The anode-cathode potential for tube 3 is of the order of 200 volts. The R. F. head operates satisfactorily at 500 to 560 megacycles but with properly dimensioned lines and cavities will operate at other frequencies.

Because of the compact and integral construction above described, the stray capacitance and inductance of the leads interconnecting the tubes is reduced to a minimum. On the other hand, the tubes 1, 2 and 3 are readily accessible and easily removed and the entire structure can be produced very cheaply and economically by die-casting processes.

We claim as our invention:

A supporting structure for tubes constituting an oscillator, an amplifier and a mixer or converter in a high frequency circuit comprising a conductive enclosure subdivided by conductive walls into three chambers, an electron tube having a cathode, anode and a control electrode supported within the first of said chambers with its cathode connected to the top wall thereof by removable connectors, said control electrode being connected to an intermediate point on said chamber wall through a suitable impedance, and said anode being connected to a central conductor extending upward from the floor of its containing chamber, a mixer tube having a cathode, anode and control electrode, supported within said second chamber by a central tubular conductor having its upper end connected to the top wall of said second chamber, the control electrode of said mixer tube being positioned adjacent the floor of said second chamber and connected thereto, an amplifier tube having a cathode, anode and control electrode, supported within the third chamber with its cathode removably connected to the top wall thereof and its anode connected to a tubular conductor projecting upward from the floor of said third chamber, a tubular conductor having its lower end connected to the floor of said third chamber and its upper end removably connected to the control electrode of said amplifier tube, a conductor extending from a point on the anode conductor of said amplifier tube to a point on the cathode conductor of said mixer, and a second conductor extending from a point on the cathode conductor of said mixer into inductive relationship with the interior of said first chamber.

FORREST S. MABRY.
WILLIAM R. WILSON.

REFERENCES CITED

The following references are of record in the file of this patent:

UNITED STATES PATENTS

| Number | Name | Date |
|---|---|---|
| 2,266,500 | Lindenblad | Dec. 16, 1941 |
| 2,277,638 | George | Mar. 24, 1942 |
| 2,411,424 | Gurewitsch | Nov. 19, 1946 |
| 2,415,977 | Turner | Feb. 18, 1947 |
| 2,416,567 | McArthur | Feb. 25, 1947 |
| 2,429,811 | Guarrera | Oct. 28, 1947 |
| 2,436,398 | Morton | Feb. 24, 1948 |
| 2,457,997 | George | Jan. 4, 1949 |
| 2,462,866 | Hotine | Mar. 1, 1949 |
| 2,474,608 | Wheeler | June 28, 1949 |